W. A. GEIGER.
ROLLER SIDE BEARING.
APPLICATION FILED OCT. 23, 1914.
1,175,351. Patented Mar. 14, 1916.
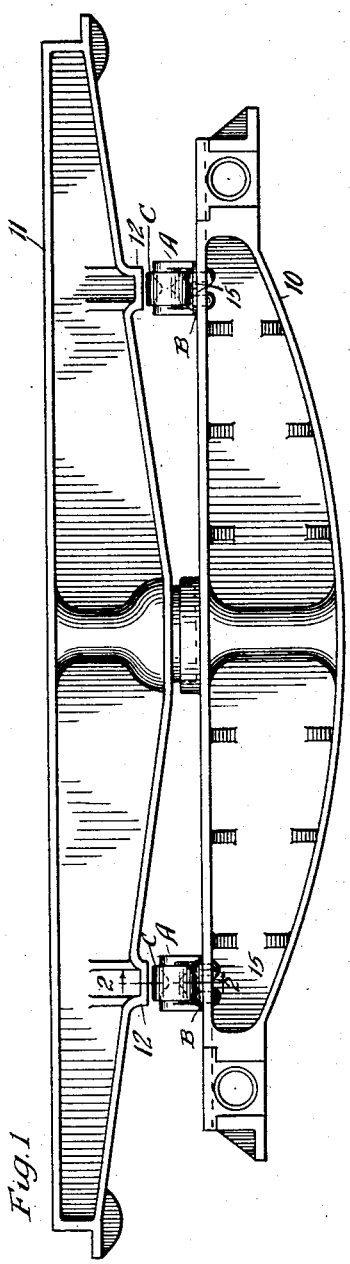
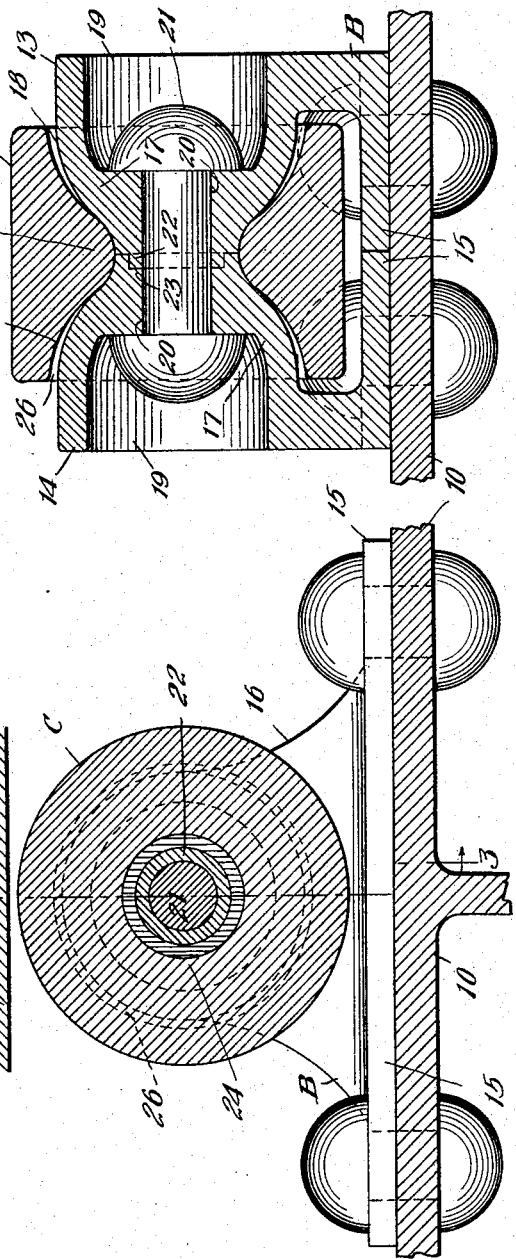
INVENTOR.
William A. Geiger
BY George T. Haight
his ATTORNEY

UNITED STATES PATENT OFFICE.

WILLIAM A. GEIGER, OF CHICAGO, ILLINOIS, ASSIGNOR TO WILLIAM H. MINER, OF CHAZY, NEW YORK.

ROLLER SIDE BEARING.

1,175,351.  Specification of Letters Patent.  Patented Mar. 14, 1916.

Application filed October 23, 1914. Serial No. 868,152.

*To all whom it may concern:*

Be it known that I, WILLIAM A. GEIGER, a citizen of the United States, residing at Chicago, in the county of Cook and State of Illinois, have invented a certain new and useful Improvement in Roller Side Bearings, of which the following is a full, clear, concise, and exact description, reference being had to the accompanying drawings, forming a part of this specification.

This invention relates to improvements in roller side bearings.

The object of the invention is to provide a side bearing for railway cars which consists of few parts that may be cheaply and easily manufactured and assembled and which will provide a bearing efficient in operation.

The invention furthermore consists in the improvements in the parts and devices and in the novel combinations of the parts and devices as herein shown, described or claimed. And although I herein show and describe in detail one form of my improvements, yet I do not wish to be confined to the details shown and described, inasmuch as I am aware that various changes and modifications may be made in the arrangement and details of the parts without departing from the spirit of the invention, and I contemplate all such changes and modifications as fall within the scope of the claims forming a part hereof.

In the drawing, Figure 1 is an elevational view of a body and truck bolster of a railway car, showing my improvements in connection therewith. Fig. 2 is an enlarged vertical sectional view taken substantially on the line 2—2 of Fig. 1 and showing more particularly the improved side bearing, and Fig. 3 is a similar sectional view taken substantially on the line 3—3 of Fig. 2.

In said drawing 10 denotes the truck bolster which is swiveled in the usual manner to the body bolster 11 and, as shown, the body bolster is provided with an integral bearing plate 12 on each side of the king pin. Coöperable with each bearing plate 12, is one of my improved roller bearings designated generally by the reference A. As shown, the roller bearing A comprises a base member or bracket B and an antifriction roller C. The bracket B consists of two parts 13 and 14, each of which has a flange or base at the bottom thereof 15 by which it is secured to the truck bolster by rivets or other suitable fastening devices. Extending upwardly from each base 15 is an arm 16 having on the inner side thereof an inwardly projecting boss 17, provided with a reversely curved surface 18, the boss 17 being partially hollowed out as indicated at 19 and recessed as at 20 to permit the passage of a rivet 21 therethrough. The member 13 is provided with an annular rib 22 on its inner face which fits in a corresponding socket 23 formed on the inner face of the boss on the member 14 to thereby provide a firm connection between the members 13 and 14 when the same are assembled and held together by the headed rivet 21.

The roller C is a substantially cylindrical member, having an inwardly extending, centrally disposed rib 24 on the inner side thereof, which rib is also provided with a reversely curved surface 25 adapted to coöperate with the curved surface 18 on the bosses 17, there being, as shown, a clearance 26 between the curved surfaces of the roller and the bracket near the outer edges of the roller which clearance, as will be understood, permits the roller to have an oscillating or rocking movement on the bracket in a plane transverse to the plane in which it rotates, the amount of oscillation being limited or stopped when the outer edges of the roller engage the bosses 17. In this way, the roller C not only acts in the usual manner to diminish the friction during the relative radial movements of the two bolsters but accommodates itself to the various inclinations of the bolsters.

From the preceding description it will be seen that the roller bearing is of simple form, of substantial construction and one which may be readily manufactured and assembled at relative slight expense.

I claim:

1. In a side bearing for railway cars, the combination with a supporting bracket, of a roller of substantially cylindrical form having a circular, inwardly extending rib on the inner side thereof, said bracket comprising two members each having an inwardly extending boss, the bosses being united and extending through the center of the roller to thereby form a journal for the latter.

2. In a side bearing for railway cars, the combination with a supporting bracket, of a roller having an inwardly extending rib on the inner side thereof and provided with reversely curved surfaces, the bracket having two upstanding arms with a portion extending therebetween and through the roller, said portion having coöperating reversely curved surfaces.

3. In a side bearing for railway cars, the combination with a supporting bracket, of a roller having an inwardly extending rib on the inner side thereof and provided with reversely curved surfaces, the bracket having two upstanding arms with a portion extending therebetween and through the roller, said portion having coöperating reversely curved surfaces, the bracket being formed in two pieces united by a rivet extending therethrough.

4. In a roller side bearing for railway cars, the combination with a roller having a circular rib on the inner side thereof, said rib having reversely curved surfaces, of a supporting bracket for said roller, said bracket comprising two members each of which is provided with an upstanding arm and an inwardly extending hollow boss, said bosses being united by a rivet and having reversely curved exterior surfaces coöperating with the curved surfaces of said rib.

WILLIAM A. GEIGER.

Witnesses:
CARRIE G. RANZ,
LUCILLE HIGGINS.

Copies of this patent may be obtained for five cents each, by addressing the "Commissioner of Patents, Washington, D. C."